United States Patent
Akiyama et al.

[19]

[11] Patent Number: 5,812,661
[45] Date of Patent: Sep. 22, 1998

[54] SOFTWARE REPRODUCTION APPARATUS

[75] Inventors: Ryota Akiyama; Makoto Yoshioka, both of Kawasaki, Japan

[73] Assignee: Fujitsu Limited, Kawasaki, Japan

[21] Appl. No.: 510,122

[22] Filed: Aug. 1, 1995

[30] Foreign Application Priority Data

Aug. 10, 1994 [JP] Japan ................................. 6-219364

[51] Int. Cl.$^6$ ...................................................... H04L 9/00
[52] U.S. Cl. .................................................. 380/4; 380/49
[58] Field of Search ................................. 380/4, 25, 49

[56] References Cited

U.S. PATENT DOCUMENTS

| | | |
|---|---|---|
| 4,247,106 | 1/1981 | Jeffers et al. . |
| 4,433,207 | 2/1984 | Besto ................................. 380/4 |
| 4,439,670 | 3/1984 | Basset et al. . |
| 4,446,519 | 5/1984 | Thomas . |
| 4,484,217 | 11/1984 | Block et al. . |
| 4,558,176 | 12/1985 | Arnold et al. ....................... 380/4 |
| 4,590,557 | 5/1986 | Lillie . |
| 4,646,234 | 2/1987 | Tolman et al. ...................... 380/4 |
| 4,649,510 | 3/1987 | Schmidt . |
| 4,654,799 | 3/1987 | Ogaki et al. . |
| 4,658,093 | 4/1987 | Hellman ............................. 380/4 |
| 4,672,554 | 6/1987 | Ogaki . |
| 4,674,055 | 6/1987 | Ogaki et al. . |
| 4,740,890 | 4/1988 | William .............................. 380/4 |
| 4,780,905 | 10/1988 | Cruts et al. ........................ 380/44 |
| 4,787,050 | 11/1988 | Suzuki . |
| 4,816,653 | 3/1989 | Anderl et al. . |
| 4,816,654 | 3/1989 | Anderl et al. . |
| 4,817,140 | 3/1989 | Chandra et al. .................... 380/4 |
| 4,864,516 | 9/1989 | Gaither et al. . |
| 4,879,645 | 11/1989 | Tamada et al. .................... 380/4 |
| 4,949,257 | 8/1990 | Orbach . |
| 4,999,806 | 3/1991 | Chernow et al. .................. 380/4 |
| 5,006,849 | 4/1991 | Baarman et al. . |
| 5,008,814 | 4/1991 | Mathur . |
| 5,014,234 | 5/1991 | Edwards, Jr. ...................... 380/4 |
| 5,016,009 | 5/1991 | Whiting et al. . |
| 5,051,822 | 9/1991 | Rhoades . |
| 5,056,009 | 10/1991 | Mizuta . |
| 5,103,392 | 4/1992 | Mori .................................. 380/4 |
| 5,103,476 | 4/1992 | Waite et al. ....................... 380/4 |
| 5,166,886 | 11/1992 | Molnar et al. .................... 380/4 |
| 5,181,107 | 1/1993 | Rhoades . |
| 5,199,066 | 3/1993 | Logan ............................... 380/4 |
| 5,214,697 | 5/1993 | Saito ................................. 380/4 |
| 5,222,134 | 6/1993 | Waite et al. ....................... 380/4 |
| 5,224,166 | 6/1993 | Hartman. Jr. ..................... 380/4 |
| 5,245,330 | 9/1993 | Wassink ....................... 340/825.34 |
| 5,267,171 | 11/1993 | Suzuki et al. . |
| 5,272,750 | 12/1993 | Shear ................................. 380/4 |
| 5,386,471 | 1/1995 | Bianco ............................... 380/4 |
| 5,410,598 | 4/1995 | Shear ................................. 380/4 |
| 5,495,411 | 2/1996 | Ananda ............................. 380/4 |
| 5,548,645 | 8/1996 | Ananda ............................. 380/4 |
| 5,563,946 | 10/1996 | Cooper et al. ..................... 380/4 |

OTHER PUBLICATIONS

Japanese Patent Laid–Open Publication No. 57–127249, Aug. 7, 1982 (equivalent to Japanese Patent Publication No. 61–22815).

Japanese Patent Laid–Open Publication No. 5–89363, Apr. 9, 1993.

Japanese Patent Laid–Open Publication No. 5–266575, Oct. 15, 1993.

Japanese Patent Laid–Open Publication No. 5–298085, Nov. 12, 1993.

Japanese Patent Laid–Open Publication No. 6–95871, Apr. 8, 1994.

*Primary Examiner*—Salvatore Cangialosi
*Attorney, Agent, or Firm*—Staas & Halsey

[57] ABSTRACT

This invention provides an input switchover means for switching input routes according to the type of medium or communications, a software management means for decoding encrypted software information and for managing monetary charges according to the usage amounts of this software, an information conversion section for converting decoded data outputted from the previously mentioned software management means to visible or audible data, and an output route switchover means for outputting to the previously mentioned software management means encrypted software data, and for outputting to the previously mentioned information conversion section non-encrypted software information.

7 Claims, 7 Drawing Sheets

SOFTWARE REPRODUCTION APPARATUS

BACKGROUND OF THE INVENTION

The present invention relates to a software reproduction apparatus.

The present invention relates to an effective technology applicable for distribution systems for computer programs or software such as copyrighted image materials, etc., especially digitized information software.

As large-scale memory media such as CD-ROM, MO etc., and large-volume, high-speed communications technologies such as B-ISDN, etc., are further developed, it is expected that not only, of course, computer programs that use these means, but also image and sound, will be distributed as digital data.

In other words, copyrighted image analog data that have been supplied in the past in such forms as video tapes are now being stored as degital data in CD-ROM and sold, or such materials are beginning to be distributed within the market as game software through utilizing the interactive (bidirectional) nature of CD-ROM.

Also, the same situation is occurring with communications circuits: such data as the previously mentioned copyrighted image data are now beginning to be placed in the hands of users via communications.

Incidentally, it is extremely easy to copy this type of digital data onto other media. Moreover, since there is no worry that deterioration will occur through the copying of digital information as occurs when analog information is copied, it is possible to duplicate digital information, and there is an extremely high possibility that these types of acts of copying will impair the profits of manufacturers. In other words, it is easy to copy the contents of a CD-ROM with only a rudimentary knowledge of DOS commands, so long as the would-be copier posses an optical magnetic disk or an optical magnetic disk apparatus, etc., that is capable of large-volume rewrites.

In this way, for the reason that a sufficient security check is impossible, acts of renting these types of digital data media have, in most cases, been prohibited by manufacturers.

However, currently end-users often hesitate to purchase this type of software because the price is too high, or because they don't know if the software will truly match their desired software, or they wait to ascertain whether or not the software is usable on the hardware that they now possess.

In regards to this point, a new software offering system is beginning to be realized wherein multiple software with limited functions are stored on a CD-ROM and sold for a low price, and whereby the end-user pays a fee for desired software on the CD-ROM, and is thereby notified of a code that will remove the functional limitations.

However, the software offering method noted above cannot be said to have sufficiently reflected the special characteristics of the software.

In other words, for the previously mentioned removal of functional limitations, the fee payment in most cases consists of a one-time only, lump-sum payment, and this fee inevitably consists of a high amount. Thus, for example, in those cases where a user only wants to view for a short period a single scene of an image, or when a user wants to use a spreadsheet for only a week, it is difficult to manage fees according to the usage amounts.

In regards to this point, a method was proposed in the Laid-Open Patent No. 19707/1996 whereby the usable price amount was registered beforehand on an IC card, and, in the case where billable software is used, the usable price amount on the IC card is registered within the system, and every time an applicable item of software is used, the system deducts the amount from the balance.

Also, a method was proposed by the present applicants in the Laid-Open Patent No. 9687/1995 whereby a rewriteable domain is provided within the memory medium of the CD-ROM, etc., and whereby usage-time data is managed.

SUMMARY OF THE INVENTION

The present invention provides an input switchover means for switching input routes according to the type of data offering format (for example, communications or a medium) provided to the user, a software management means for decoding encrypted software data and for managing monetary charges according to the amount of the software data used, a data conversion section for converting decoded data output from the previously mentioned software management means to output data for presenting to the user, and an output route switchover means for outputting encrypted software data to the previously mentioned software management means, and for outputting non-encrypted software data to the previously mentioned data conversion section.

DESCRIPTION OF THE PREFERRED EMBODIMENT

Figure 1:
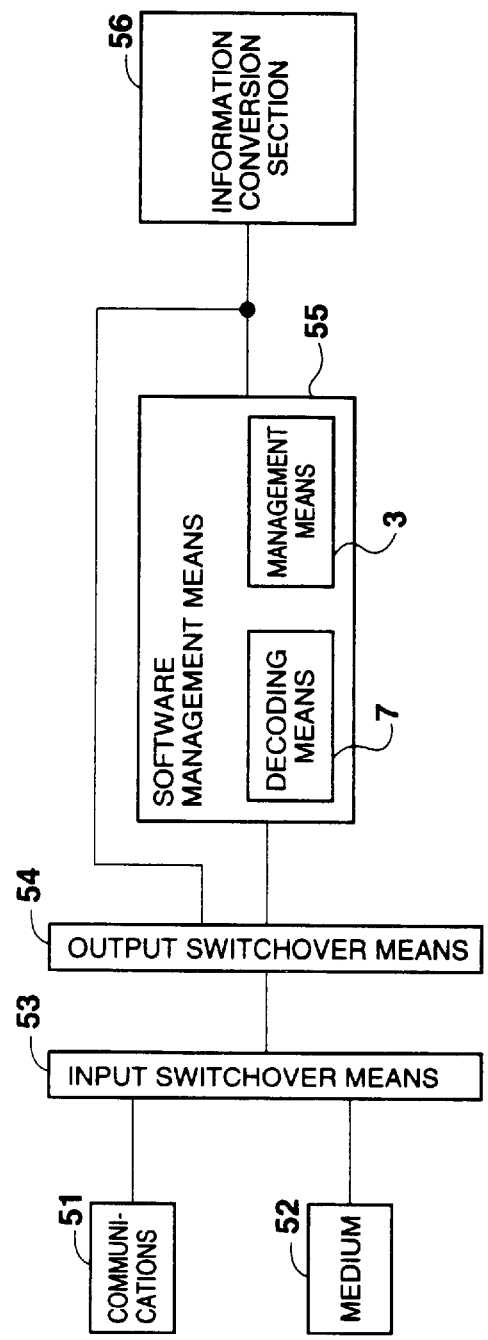
FIG. 1 is a theoretical diagram of the present invention.

The present invention, as shown in the conceptual diagram that is FIG. 1, basically provides an input switchover means (53) that switches the input route according to the type of data offering format (here, communications (51) or a medium (52)) provided to the user, a software management means (55) for decoding encrypted software data and for managing monetary charges according to the amount of the software data used, a data conversion section (56) for converting decoded data output from the previously mentioned software management means (55) to output data for presenting to the user, and an output route switchover means (54) for outputting encrypted software data to the previously mentioned software management means (55), and for outputting non-encrypted software data to the previously mentioned data conversion section (56).

Software data is, for example, program, sound, animation, or still image, etc., data, and this software data may be obtained from the route of public-circuit, dedicated communications-circuit, etc., wired/wireless communications (51), or it may be obtained by the method of a CD-ROM, an optical magnetic disk, a portable magnetic disk, etc., medium (52).

Software data provided to the user through these means consists of encrypted data and non-encrypted data; encrypted software data is managed by the monetary charges system to be discussed below according to the usage amount (reproduction amount) of that software data.

The software management means (55) is comprised of, for example, a decoding means (7) called a "DES" (Data Encryption Standard) equipped with various blocks for decoding the previously mentioned software data, and through key data granted from the management center that is not shown in FIG. 1, encrypted data is deciphered into ordinary text. Also, the software management means (55) is equipped with a management means (3) for managing usage amounts of this type of encrypted software data. This management means is equipped internally with a monetary charges information memory means that includes monetary tables, etc., and is made to execute monetary charges according to software usage amounts (reproduction amounts).

The data conversion section (56) is, for example, a section for performing expansions of compressed image data, and for controlling the synchronism of image data and sound data, and this data conversion section (56) is connected to an external speaker, a TV monitor, etc.

Within the present invention, the output switchover means (54) is made to, when the software data is encrypted, output that data to the software management means (55), and when the software is not encrypted, to directly output that data to the data conversion section (56). Therefore, with the present invention, both encrypted software and non-encrypted software is uniformly manipulatable.

Next, a specific preferred embodiment will be explained.

Figure 2:
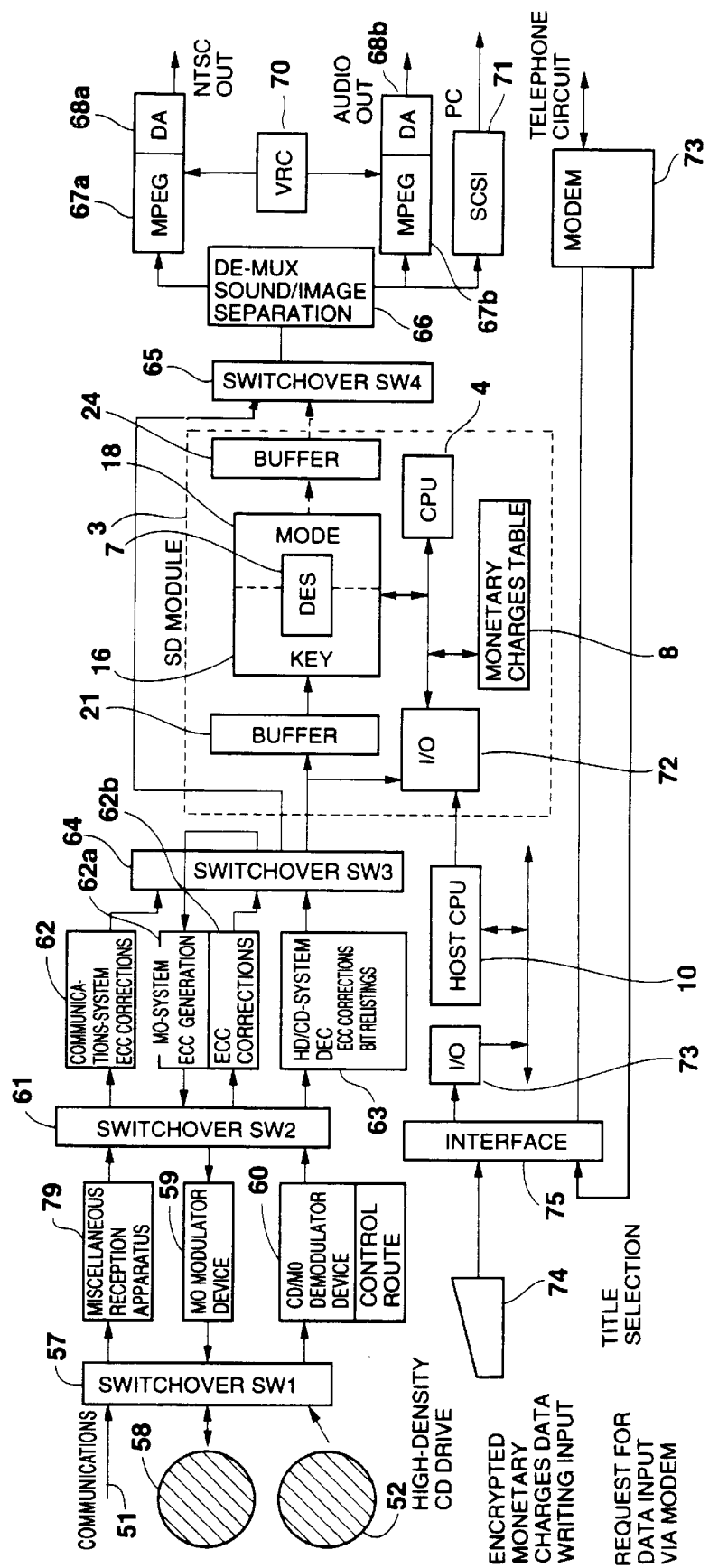
FIG. 2 is a block diagram showing the configuration of the software reproduction apparatus that is a preferred embodiment of the present invention.

FIG. 2 is a functional block diagram that shows the internal configuration of the software reproduction apparatus 105 that is a preferred embodiment of the present invention.

In the diagram, the switchover switch 57 (SW1) may also function as the input interface, and inputs software data from various offering routes, including the communications circuit 51, the CD-ROM 52, etc. Also, within this switchover switch 57 (SW1), it is also possible to rewrite software data through an optical magnetic disk drive apparatus not shown in the diagram to the optical magnetic disk 58. In other words, the switchover switch 57, although abbreviated in the diagram, is comprised of a miscellaneous reception apparatus and an interface circuit for generating interrupt signals when individual signals are received at separate input terminals, and is operated through the control of the host CPU 10.

Placed on the next level after the switchover switch 57 (SW1) are, as the signal processing means, the reception apparatus 58, the MO modulator device 59, and the CD/MO demodulator device 60. The reception apparatus 58 is an apparatus for converting software data provided as reception signals from the communications circuit 51 into a data format that can be manipulated within the present apparatus; the MO modulator device 59 is a modulation means for performing writing to the optical magnetic disk 58. Also, the CD/MO demodulator device 60 is a device for demodulating read data from the optical magnetic disk 58 or the CD-ROM 52, and demodulation control is accomplished through the control route.

The switchover switch 61 (SW2) is a switch for outputting selectively to each type of error processing means data outputted from the miscellaneous signal processing means explained previously. Also, in the case where writing to the optical magnetic disk 58 is performed, the switchover switch 61 (SW2) controls the transfer of inverse direction data from the error processing means to the signal processing means.

This switchover switch 61 (SW2), although abbreviated in the diagram, is comprised of a miscellaneous reception apparatus and an interface circuit for generating interrupt signals when individual signals are received at separate input terminals, and is operated through the control of the host CPU 10.

The error processing means is divided into the communications-system error processing section 62, the optical magnetic disk-system error processing section 62 [sic] (62a, 62b), and the magnetic disk/CD-system error processing section 63.

The optical magnetic disk-system error processing section 62 is comprised of an error check code generation section 62a for performing error check processing of data when such data is written to the optical magnetic disk, and an error check code correction section 62b for performing error checks when data is read from the optical magnetic disk.

Furthermore, the magnetic disk/CD-system error processing section 63 can also perform processing such as bit relisting, etc., together with error check code corrections.

In this way, with the present preferred embodiment, error processing corresponding to each offering format is enabled, and only data that has completely undergone error processing is subject to decoding processing and monetary charges processing, both to be discussed below.

Located at the last step of the previously mentioned error processing means is the switchover switch 64 (SW3). This switchover switch 64 (SW3) has the function of controlling routes, either by outputting to the software management section 3 of the next step the software data processed with the previously mentioned signal processing means and the error processing means, or by outputting this data to the switchover switch 65 (SW4) to be discussed below; or it may take output from the previously mentioned error check code correction section 62b and return it to the error check code generation section 62a.

Writing from a CD-ROM to an Optical Magnetic Disk

Here, the sequence of controlling the switchover switch 64 (SW3), and of writing encrypted software data read from the CD-ROM 52 to the optical magnetic disk 58 will be simply explained.

First, data read from the CD-ROM 52 through route switching by the switchover switch 57 (SW1) operated by the host CPU 10 is inputted to the CD/MO demodulator device 60. Data that is demodulated here is sent to the magnetic disk/CD-system error processing section 63 through a route switchover by the switchover switch 61 (SW2). Data that has undergone error check code correction and bit relisting here has added to it an error check code corresponding to the optical magnetic disk sent to the error check code generation section 62a through a route switchover by the switchover switch 64 (SW3). Then, this data, through a route switchover by the switchover switch 61 (SW2), is sent to the MO modulator device 59, where it is transformed into a data format that can be written onto the optical magnetic disk 58, and, through the switchover switch 57 (SW1), the data is then written onto the optical magnetic disk 58.

In this way, data written onto the optical magnetic disk 58 is sent from the switchover switch 57 (SW1) via the CD/MO demodulator device 60, the switchover switch 61 (SW2), the optical magnetic disk error processing section 62a [sic], and the switchover switch 64 (SW3), and is inputted to the software management section 3; data that has been decoded here is inputted via the switchover switch 65 (SW4) to the sound-image separation section 66 (DE-MUX), and is output through MPEG 67a, MPEG 67b, etc., externally as image data or sound data. Here, MPEG processing is performed in conformance with "ISO/IEC CD13818' 1–3".

The Configuration of the Software Management Section

The software management section 3 is realized with module architecture, for example, with an IC card (for example, a card format that conforms to PCMCIA), a board, etc., and is chiefly comprised of a DES (Fip's Publication Co.'s 460DATA ENCRYPTION STANDARD NIST) as the decoding section 7 that possesses the input buffer 21 and the output buffer 24.

The previously mentioned DES is made to receive the key data 16 from an external source, and, based on this key data, the DES functions and is made to decode encrypted data. Furthermore, within the present preferred embodiment, the DES possesses a mode identification section 18 (MODE), and this mode identification section 18 has the function of selecting the most appropriate mode from multiple DES modes for the specific data format, etc.

An Explanation of the DES Mode

Next, a representative block of the previously mentioned DES mode will be explained.

Figure 3:
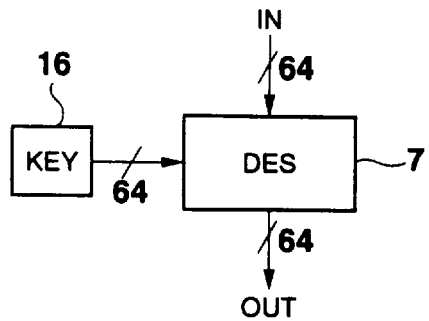
FIGS. 3A–FIG. 3D are explanatory diagrams showing the DES mode of the preferred embodiment.
Figure 3:
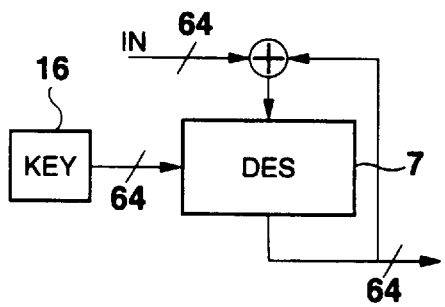
Figure 3:
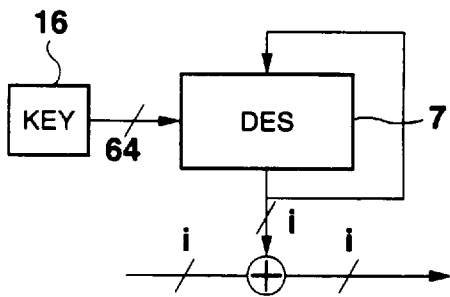
Figure 3:
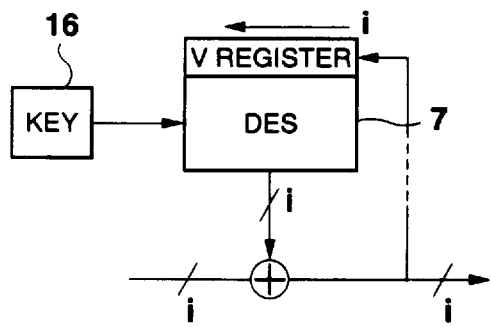

FIG. 3A is the ECB base mode, and it is a mode that, within the decoding section 7 (DES), encrypts (or decodes) a 64-bit input data string from the 64-bit key data 16 to a 64-bit output data string.

FIG. 3B shows the CBC mode, which, after a 64-bit input data string is encrypted (or decoded) with the 64-bit key data 16 within the decoding section 7 (DES), once again feedback inputs this data into the decoding section 7 (DES). In this way, this consists of a method for outputting finished results, in which until all of the data has been completely inputted, feedback is performed; this method is suitable for data processing of files, etc.

FIG. 3C shows the OFB mode, which is suitable for sound data, etc., that can have a significant impact on other data if it contains only a single error, and communications data, which is highly susceptible to error.

FIG. 3D shows the CFB mode, which is suitable for self-synchronous data.

The previously mentioned mode identification section 18 analyzes data format, etc., and reads out the most suitable of these modes from the mode table 20, and sends this mode to the decoding section (DES). The decoding section 7 (DES) performs encryption/decoding processing based on the mode that is selected in this way.

Details of the Decoding Section

Figure 4:
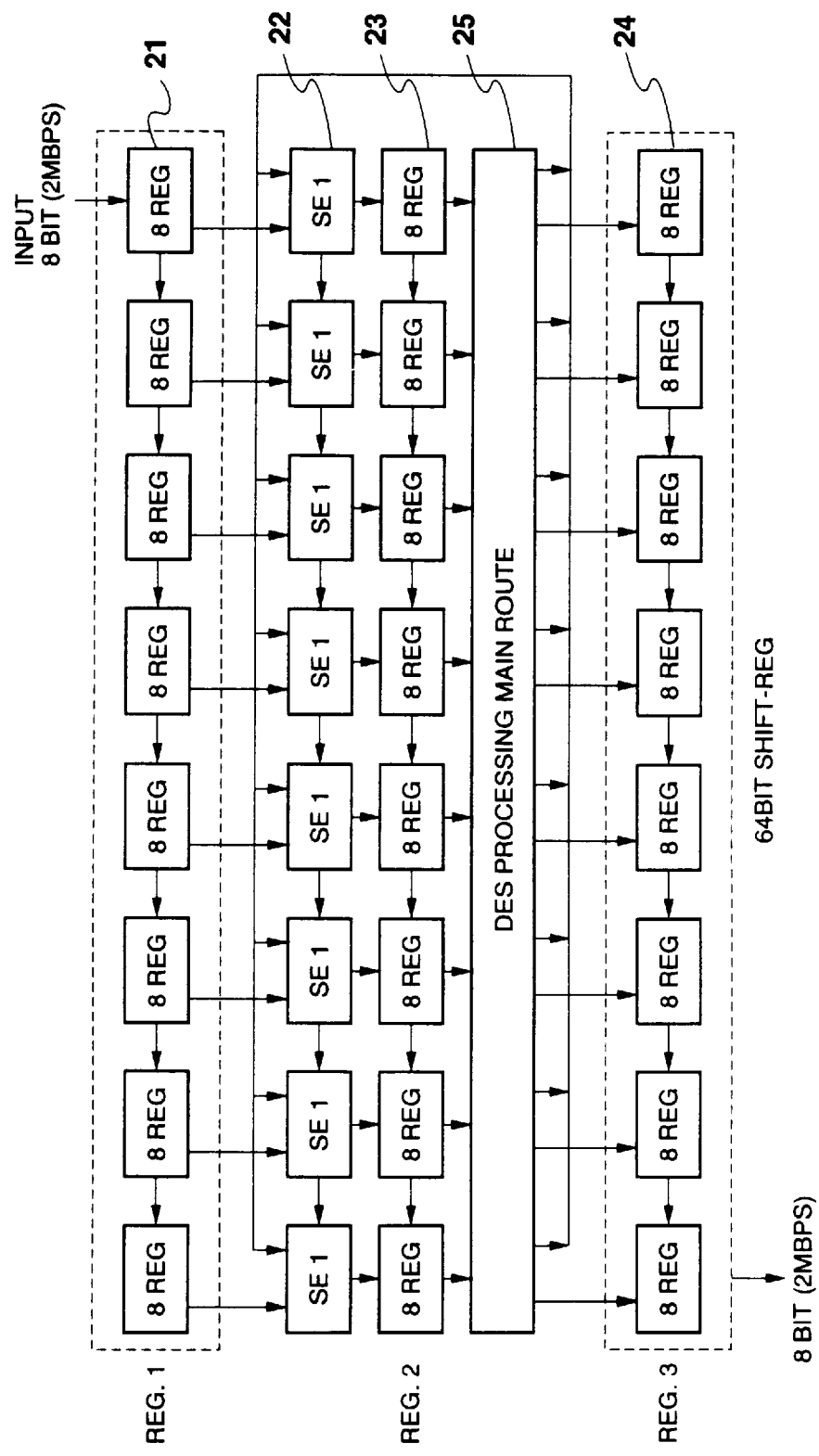
FIG. 4 is a block diagram showing a detailed configuration of the DES of the preferred embodiment.

FIG. 4 is a block diagram showing the hardware configuration of the decoding section 7.

In the diagram, as the input buffer 21 of the input side, a 64-bit register (REG1) that consists of 8 connected registers, each with an 8-bit configuration, is placed, and on the next level selectors (sel) are placed. These selectors (sel) are made to input selectively either output from the DES processing main circuit 25 to be discussed below, or output from the previously mentioned shift register (REG1).

Placed on the next level after the selectors (sel) is register 23 (REG2), each register of which has an 8-bit configuration, and placed on the next level is the DES processing main circuit 25. This DES processing main circuit 25 functions as the DES that is the core of the decoding section 7. In other words, within the DES processing main circuit 25 is registered as ROM (Read Only Memory) each type of DES mode explained with FIG. 3. This DES processing main circuit 25 is made to select the optimum DES mode logic through commands from the control CPU 4, and to perform decoding processing.

Output from the previously mentioned DES processing main circuit 25 branches out to the output register (REG3) that is the output buffer 24 and to the previously mentioned selectors (sel). Then, output from the output register (REG3) is used as either encrypted or decoded data.

Figure 5:
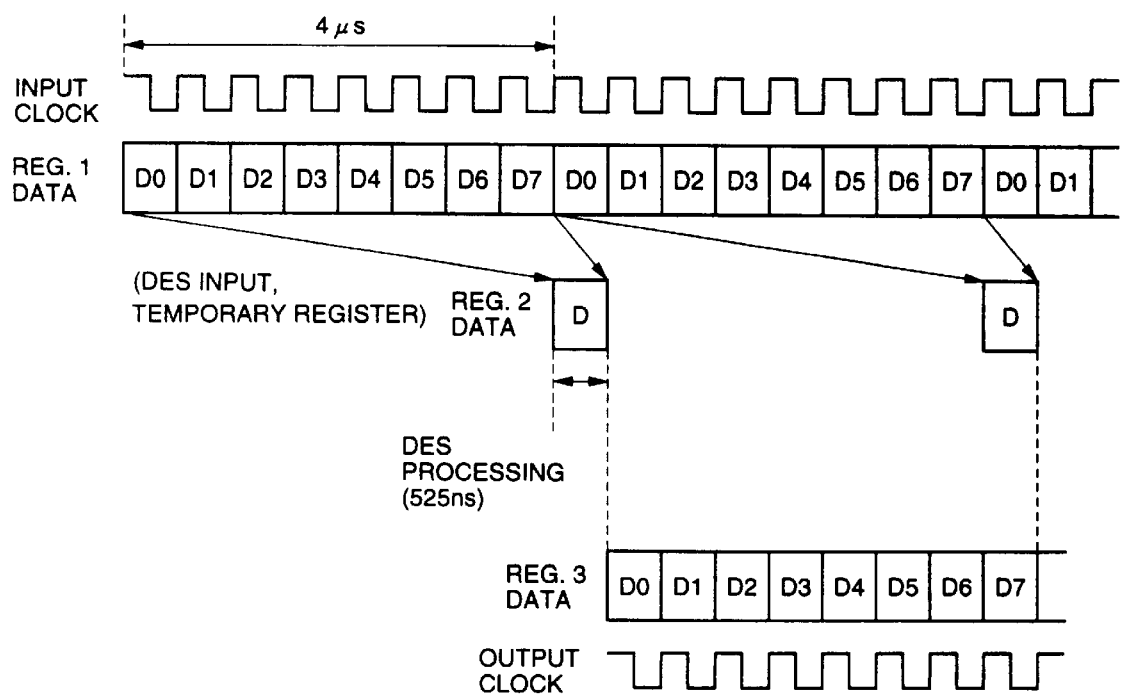
FIG. 5 is a chart diagram showing the timing of DES input and output of the preferred embodiment.

The sequence of this processing is shown in FIG. 5.

In FIG. 5, output from the input register (the input buffer 21) undergoes DES processing as output from register 23 with the first clock of the next cycle. Then, it is outputted from the output register (the output buffer 24) with the next clock. At the time of output from this output register (the output buffer 24), within the input side is performed a take-in from the input register (the input buffer 21) of the encrypted data for the next cycle.

In this way, with the present preferred embodiment, through having provided independently the input register (REG1) as the input buffer 21 and the output register (REG3) as the output buffer 24, both inputting of encrypted data and outputting of decoded data may be performed continuously and independently. As a result, compared with existing DES where input and output is performed cyclically, high-speed encrypting/decoding processing has been made possible.

The decoding section 7 (DES) explained above is controlled by the control CPU 4; connected to the bus of this control CPU 4, besides the previously mentioned decoding section 7 (DES), is the monetary charges table 8, which is comprised of memory, and the interface 72 (I/O).

Within the monetary charges table 8 is registered a prescribed balance value, and monetary charge values are deducted according to the decoding processing amounts or processing time for encrypted software data.

Figure 6:
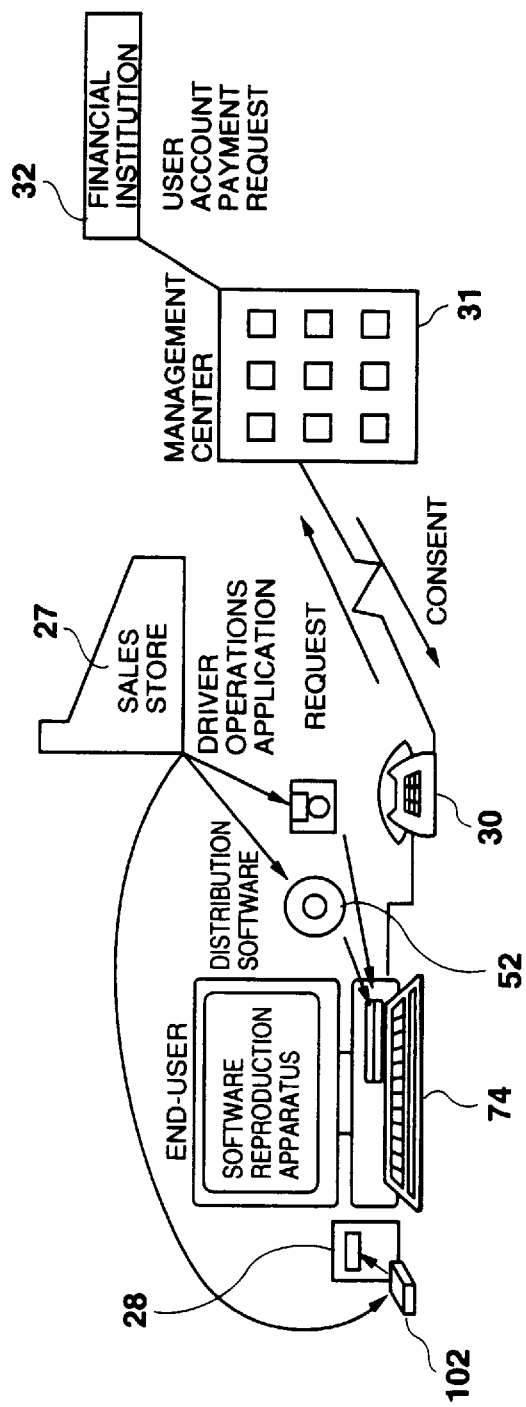
FIG. 6 is a conceptual diagram showing an overall image of software usage of the present invention.

In the case where one wants a balance value updated, as shown in FIG. 6 to be described below, a person brings the software management module 102 that is offered as a card medium to a sales store, etc., and by paying the fees, the person may have the balance value of the monetary charges table increased.

The interface 72 (I/O) is connected to the host CPU 10 exterior to the software management section 3. Furthermore, the previously mentioned CPU 4 can be made to work together with the host CPU 10 of the host apparatus (in other words, the software reproduction apparatus entity) side.

Output from the software management section 3 is output through the switchover switch 65 (SW4) to the sound-image separation section 66 (DE-MUX: demultiplexer), the image extension section 67a, and the sound extension section 76b (MPEG), etc., which comprise a portion of the data conversion section.

Image data separated from sound data with the sound-image separation section 66 (DE-MUX) is extended with the image extension section 67a (MPEG), converted with the DA conversion section 68a, and is outputted as NTSC signals to an analog display apparatus such as a TV display, etc.

Sound data is extended with the sound extension section 67b (MPEG), converted with the DA conversion section 68b, and outputted as audio signals to an analog audio apparatus such as a speaker, etc. Then, the synchronism of image and sound is controlled by the synchronism control section 70 (VCR).

With the present preferred embodiment, regardless of whether software is encrypted or is not encrypted, it can be uniformly reproduced.

Also, software data from different offering routes can also be manipulated uniformly; if, for example, software data obtained from a CD-ROM or software data obtained from a communications circuit is stored on a writable medium such as the optical magnetic disk 58, etc., through each type of switchover switch, usage and reproduction may be performed when required.

Figure 7:
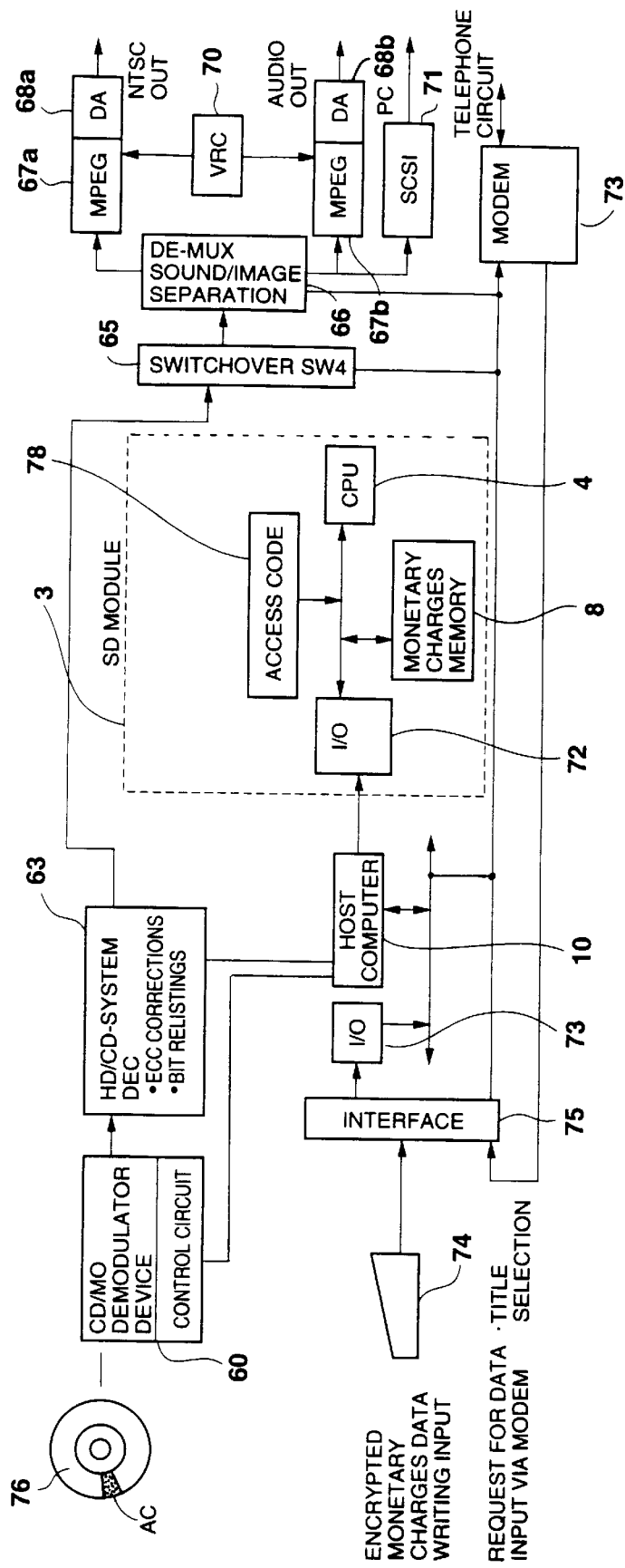
FIG. 7 is a main block diagram showing the configuration of the software reproduction apparatus that is a variation of the preferred embodiment.

FIG. 2 as explained above is an example of a configuration case in which the CD-ROM 52, the communications circuit 51, and the optical magnetic disk 58 were handled uniformly; however, as shown in FIG. 7, data within a medium that is offered does not have to be encrypted-it may also have an access code given to it.

In other words, in FIG. 7, within a portion of the CD-ROM 76 is registered an access code (AC) for permitting access to this CD-ROM, and only in those cases where this access code (AC) matches a code stored within the apparatus is the usage (reproduction) of the software enabled.

In the diagram, the software management section 3 possesses an access code register 78, and within this access code register 78 is registered an access code for a prescribed medium 76 (or for the data within the medium).

This access code register 78 may be provided within the monetary charges table; in sum, this is a method whereby permission to reproduce is given only in those cases where reproducible software types, data names, etc., are previously registered, and where the medium 76 (CD-ROM or optical magnetic disk MO) on which the permitted data is registered is installed.

When the medium 76 is installed within the drive apparatus, and the data format is converted with the CD/MO demodulator device 60, and error processing has been executed with the magnetic disk/CD-system error processing section 63, the host CPU 10 first reads out an access code from this medium 76.

Next, the host CPU 10 accesses the access code register 78, and performs a retrieval within the key of the access code read out from the medium 76. As a result, in the case where this code was found to be registered within the access code register 78, the host CPU 10 operates the switchover switch 4 and outputs the software data from the medium 76.

With this example, since the data within the medium 76 is not encrypted, high-speed data processing is enabled.

An Overall Image of Software Distribution

FIG. 6 shows an overall view of software distribution as realized with the present invention.

Within the present preferred embodiment, software is shipped to the distribution route from a shipment center (here, for simplification, the management center and the shipment center are the same); however, the format at this time may be encrypted software stored on a CD-ROM, or it may be shipped over a communications route, or it may be shipped as an optical magnetic disk, etc.

The end user proceeds to the sales store 27, etc. (communications sales are also permissible), and purchases the CD-ROM 52 as the software storage medium that stores the software. At the same time, the user also purchases an operating application disk 26 such as drive software, etc., that makes this software reproducible on the user's software reproduction apparatus 105, and an SD card that is the software management module (on which is stored the software management section 3 of the present preferred embodiment)

Here, even though the CD-ROM stores multiple software, since this is not a sales method whereby this CD-ROM 52 is to be sold out, the sales price of the CD-ROM itself may be set at a low price. Also, the sales store 27 may also be a rental store.

In other words, within the present invention, all of the software data stored on the CD-ROM 52 is encrypted, and in the case where this data is decoded and reproduced, it is essential that the SD card 102 that maintains a high level of security be used. Also, as will be discussed below, a charge collection system corresponding to the amount of software used is put fully into place. Furthermore, even if the encrypted data stored on the CD-ROM itself is copied onto a separate medium (for example, the optical magnetic disk 58), this alone is meaningless; and even if the CD-ROM is rented, if a charge collection system that corresponds to the amount of software used is fully in place, there will be no decline in the profits of the software provider.

The end user, in the case where he or she desires to reproduce the software stored on this CD-ROM 52 within his or her own software reproduction apparatus 105, first inserts the SD card 102 into the card drive apparatus 28. Then, the user loads both the CD-ROM 52 and the operating application disk 26 into the software reproduction apparatus 105.

Then, the user starts up the communications application (this communications application may also be provided as an operating application) inserted within the software reproduction apparatus 105, and sends from the modem 73 through the home telephone unit 30 a software usage request to the management center 31. In response, the management center 31 encrypts a consent command (key data) for this user and sends it to the software reproduction apparatus 105.

Furthermore, this usage request and usage consent may also take the format of the end user verbally communicating the code with an operator.

The software reproduction apparatus that has received the previously mentioned consent command reads the CD-ROM 52, sequentially decodes the required software through the decoding section 7 (DES) of the SD card, and transmits this software to the program storage area (memory) of the software reproduction apparatus 105.

Along with this, the control CPU 4 counts either the decoded data amount or the decode time for this software, and deducts a monetary charges balance value from the monetary charges table 8. Then, until the monetary charges balance value becomes "0", the control CPU 4 continues decoding processing of decrypted software data.

Here, in the case where the monetary charges balance value of the monetary charges table becomes "0", the control CPU 4 terminates output of encrypted software data. Furthermore, prior to or following termination of output of software data, the user may be warned through image or sound data of a monetary charges balance insufficiency.

What is claimed is:

1. A software reproduction apparatus for reproducing encrypted or non-encrypted software data received via an input route including a storage medium and by communications with a remote source, and for executing monetary charges according to the usage of the software comprising:

signal processing means for performing unique signal processing based on the input route of the software data; and error processing means for conducting error processing based on the input route;

input switchover means for selecting an input route, said input switchover means comprising:

first switchover means for outputting encrypted and non-encrypted software data to said signal processing means and;

second switchover means for receiving the output from said signal processing means and directing the output of said signal processing means to said error processing means;

software management means for decoding encrypted software data and for managing monetary charges according to the usage of the software data;

data conversion means for converting decoded data outputted from said software management means to output data offered to the user; and output route switchover means for receiving encrypted data from said input switchover means and outputting the encrypted data to said software management means, and for receiving non-encrypted software data from said input switchover means and outputting the non-encrypted software data to said data conversion section.

2. The software reproduction apparatus of claim 1 further comprising:

drive apparatus for installing a writable medium;

writing means for writing on to said medium encrypted software data obtained from the said input route prior to its output to said software management means; and a means for reading encrypted software data written on said medium.

3. The software reproduction apparatus of claim 1 wherein said error processing means is equipped with an error check code generation section for generating new error check codes corresponding to the said writable medium.

4. A software reproduction apparatus for reproducing encrypted or non-encrypted software data received via an input route including a writable medium, a non-writable medium and by communications with a remote source, and for executing monetary charges according to the usage of the software, the software reproduction apparatus comprising:

input switchover means for selecting an input route;

software management means for decoding encrypted software data using key data from an external source and for managing monetary charges according to the usage of the software data;

data conversion means for converting decoded data outputted from said software management means to output data offered to the user; and output route switchover means for receiving encrypted data from said input switchover means and outputting the encrypted data to said software management means, for receiving the non-encrypted software data from said input switchover means and outputting the non-encrypted software data to said data conversion means, and for outputting the encrypted software data to a writable medium.

5. The software reproduction apparatus of claim 4 further comprising:

error management means equipped with an error check code generation section for generating new error check codes corresponding to the writable medium.

6. A software reproduction apparatus for reproducing encrypted or non-encrypted software data received via an input route including a storage medium and by communications with a remote source, and for executing monetary charges according to the usage of the software comprising:

input switchover means for selecting an input route according to the type of medium or communications;

software management means for decoding encrypted software data and for managing monetary charges according to the usage of the software data;

data conversion means for converting decoded data outputted from said software management means to output data for the user;

output route switchover means for receiving encrypted data from said input switchover means and outputting the encrypted data to said software management means, and for receiving non-encrypted software data from said input switchover means and outputting the non-encrypted software data for said data conversion section;

drive apparatus for installing a writable medium;

writing means for writing, on said medium, encrypted software data obtained from the said input route prior to the output of the encrypted software data to said software management means; and a means for reading encrypted software data written on said medium.

7. A software reproduction apparatus for reproducing encrypted or non-encrypted software data received via an input route including a storage medium and by communications with a remote source, and for executing monetary charges according to the usage of the software comprising:

signal processing means for performing unique signal processing based on the input route of the software data; and error processing means for conducting error processing based on the input route;

input switchover means for selecting an input route, said input switchover means comprising:

first switchover means for outputting encrypted and non-encrypted software data to said signal processing means and;

second switchover means for receiving the output from said signal processing means and directing the output of said signal processing means to said error processing means;

software management means for decoding encrypted software data and for managing monetary charges according to the usage of the software data;

data conversion means for converting decoded data outputted from said software management means to output data offered to the user;

output route switchover means for receiving encrypted data from said input switchover means and outputting the encrypted data to said software management means, and for receiving non-encrypted software data from said input switchover means and outputting the non-encrypted software data to said data conversion section;

drive apparatus for installing a writable medium;

writing means for writing on said writable medium encrypted software data obtained from the said input route prior to its output to said software management means; and a means for reading encrypted software data written on said medium.

\* \* \* \* \*